United States Patent
Pasquier

(10) Patent No.: US 6,235,065 B1
(45) Date of Patent: May 22, 2001

(54) ROOM TEMPERATURE LAMINATION OF LI-ION POLYMER ELECTRODES

(75) Inventor: Eric Pasquier, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/179,414

(22) Filed: Oct. 27, 1998

(51) Int. Cl.$^7$ ................................................. H01M 6/00
(52) U.S. Cl. ....................... 29/623.4; 29/623.5; 29/623.3; 429/247; 429/137
(58) Field of Search ............................. 29/623.5, 623.1, 29/623.2, 623.4; 429/247, 249, 137, 145; 419/65

(56) References Cited

U.S. PATENT DOCUMENTS

| | | | |
|---|---|---|---|
| 5,330,860 | * 7/1994 | Grot et al. | 429/42 |
| 5,593,462 | 1/1997 | Gueguen et al. | 29/623.3 |
| 5,700,300 | 12/1997 | Jensen et al. | 29/623.5 |
| 5,720,780 | 2/1998 | Liu et al. | 429/192 |
| 5,789,107 | 8/1998 | Okada et al. | 429/192 |

FOREIGN PATENT DOCUMENTS 0 803 925   4/1996  (EP) .

* cited by examiner

Primary Examiner—Stephen Kalafut
Assistant Examiner—R Alejandro
(74) Attorney, Agent, or Firm—Sughrue, Mion, Zinn, Macpeak & Seas, PLLC

(57) ABSTRACT

According to an exemplary embodiment a polyvinylidene diflouride homopolymer and solvent, such as acetone, are mixed together to form a solution. The solution is coated on a porous electrode. The coated electrode is immersed in a bath, such as denatured Ethanol, thereby creating a porous membrane on the electrode. The membrane coated electrode is then dried. After drying membrane coated electrode is placed opposite another porous electrode with the membrane positioned substantially between the first and second electrodes. The membrane is compressed between the electrodes dry bonding the membrane with the other electrode thereby forming a good physical bound. Alternatively the membrane may be formed on both electrodes and the membranes are then compressed between the electrodes thereby dry bonding the first and second electrodes together. In yet another embodiment the membrane may be formed separately then compressed between the electrodes thereby dry bonding the membrane with the two electrodes.

15 Claims, 3 Drawing Sheets

ROOM TEMPERATURE LAMINATION OF LI-ION POLYMER ELECTRODES

BACKGROUND

The present invention relates generally to electrolytic cells comprising a polymeric separator positioned between an anode and a cathode and in particular to room temperature lamination of Lithium-ion polymer electrodes for electrolytic cells.

Various processes are used in the manufacture of electrolytic cells such as those for use in Li-ion batteries. Li-ion batteries are commonly used for rechargeable battery applications and can be found in many portable electronic devices, such as cellular phones. In conventional lithium ion cells with free liquid electrolyte, the electrode/separator/electrode structure is held together by winding the structure into a roll.

In other lithium ion polymer cells the electrode/separator/electrodes structure is conventionally accomplished by either chemical or hydrogen bonding between the polymer constituents in the electrodes and the separator, respectively. Such cells are also constructed by lamination of electrode and electrolyte film cell elements. The separator or membrane is positioned between the positive and negative electrodes. The anode, membrane, and cathode are then laminated together. However, a suitable bond should be provided between the anode, membrane, and cathode or the electrode will rapidly break down under use, reducing the life and performance of the battery.

As described above, different bonding techniques are used to create battery cells and electrodes. According to one such method, an adhesive is used with the membrane to bind the elements of the electrode together. However, this method has many parameters that must be monitored and are difficult to control in an industrial manufacturing setting making such a process costly to implement. In addition, the adhesive can dissolve and break down the membrane causing it to collapse. This results in a higher cell impedance, bad power performance, and lower capacity of the cell.

Another process that is used is described in U.S. Pat. No. 5,720,780, for example. According to this method a binder of a suitable polymer, such as a polyvinylidene difluoride (PVdF) homopolymer is used with a filler material such as silica or aluminum. An appropriate plasticizer is mixed into the binder and filler materials, and the resulting structure is hot pressed into a freestanding sheet. This process requires an extra step of heating, in addition to the later process step of removing the plasticizer, that necessitates careful control of a number of manufacturing process variables and conditions.

Another method for manufacturing a battery cell having a solid electrolyte laminated onto a porous electrode structure is described in U.S. Pat. No. 5,700,300. The patent describes a three step process for electrolyte deposition. A surplus of electrolyte pre-wet material, having a relatively low viscosity, is layered onto a dry, porous electrode. Surplus pre-wet material is mechanically removed from the surface of the electrode. The pre-wet solution is allowed to absorb into the porous electrode, and the surface is coated with a high-viscosity electrolyte precursor. Curing or further processing is accomplished with standard methods. The battery can be formed by laminating a current collector/anode sheet to the surface of the electrolyte of the current collector/cathode/electrolyte laminate.

U.S. Pat. No. 5,593,462 describes a process of extruding a cathode on a metalized support film, followed by extruding the electrolyte on an assembly. A lithium anode is then extruded on a support film and the two complexes are then calendered together.

Although these two methods do not require the step of heating or the use of an adhesive, they do utilize a wet electrolyte. As a result, both methods have a weak bonding, such as hydrogen bonding, to hold the laminated structure together, instead of creating a physical bond. Because a weak bond is used, cracking or pealing of the laminate structure may occur during use thereby reducing the life and operating efficiency of a battery made from these methods. In addition, the manufacturing conditions for these methods, such as room humidity, must be carefully monitored and controlled adding to the cost of production using this method.

SUMMARY

It is therefore an object of the invention to reduce the complexity associated with processes for manufacturing electrolytic cells.

It is another object of the invention to provide a laminated structure that does not require added adhesives while providing a strong physical bond between the laminated layers.

According to an exemplary embodiment of the present invention the foregoing and other objects are accomplished through implementation of a room temperature laminating process.

According to a first embodiment of the method, a polyvinylidene diflouride homopolymer and solvent are mixed together to form a solution. The solution is coated on an electrode. The electrode is immersed in a bath thereby creating a porous membrane on the electrode. The membrane coated electrode is then dried. After drying, the membrane coated electrode is placed opposite another electrode with the membrane positioned substantially between said first and second electrodes. The membrane is compressed between the electrodes, dry bonding the membrane with the other electrode thereby forming a good physical bond.

According to another embodiment of the invention a polyvinylidene diflouride homopolymer is mixed with solvent to form a solution. The solution is coated on a first and a second electrode. The first and second coated electrodes are immersed in a bath thereby creating a porous membrane on the electrodes. The electrodes are dried. The first electrode is placed opposite the second electrode with their respective membranes positioned substantially between electrodes. The membranes are then compressed between the first and second electrodes thereby dry bonding said first and second electrodes together.

According to yet another embodiment of the invention a polyvinylidene diflouride homopolymer and solvent are mixed together to form a solution. A membrane is formed by immersing said solution in a bath. The membrane is dried and then placed substantially between two electrodes. The membrane is then compressed between the electrodes thereby dry bonding the membrane with said two electrodes.

BRIEF DESCRIPTION OF THE DRAWINGS

The foregoing and other features, objects, and advantages of the invention will be better understood by reading the following description in conjunction with the drawings, in which.

DETAILED DESCRIPTION

Figure 1A:
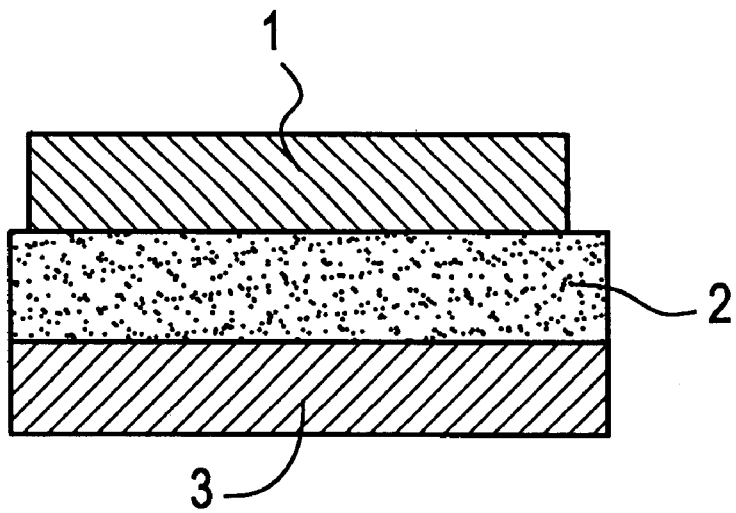
FIGS. 1A and 1B show an exemplary electrode-membrane-electrode structure.

The various features of the invention will now be described with respect to the figures, in which like parts are identified with the same reference characters.

An electrochemical cell or battery of the present invention has a negative electrode and a positive electrode. A membrane is formed between the two electrodes. An ion-conducting electrolyte provides ion transfer from one electrode to the other. For example, according to one embodiment for a Lithium ion battery, lithium ions from a source electrode move between the cell electrodes thereby charging and discharging the battery. According to one preferred embodiment of the invention, the negative electrode is approximately 120 $\mu$m thick supported with a 18 $\mu$m thick copper foil; the positive electrode is approximately 90 $\mu$m thick supported with a 20 $\mu$m thick aluminum foil.

According to an embodiment of the present invention, a polyvinylidene diflouride (PVdF) homopolymer is used to form a porous membrane. PVdF is a solid at room temperature; however, by blending the PVdF with a solvent, such as Acetone, a liquid solution is formed. One skilled in the art will appreciate that other solvents may also be used, such as, Tetrahydrofuran, Methyl Ethyl Keton, Dimethyl Formamide, Dimethyl Acetamide, Tetramethyl Urea, Dimethyl Sulfoxide, Triethyl Phosphate, Trimethyl Phosphate, N-Methyl Pyrrolidine.

According to an embodiment of the invention, the porous membrane can be formed as follows. 19 wt % PVdF homopolymer, for example, Kynar 301F, (available from Elf Atochem, King of Prussia, Pa.), is dissolved in 81 wt % Acetone, HPLC grade, (available from Aldrich, Milwaukee, Wis.) in a hermetically sealed container. The solution is then stirred at 60° C. One skilled in the art will appreciated that a mixture of different solvents can also be used to dissolve the PVdF in order to control the morphology of the final product.

According to an exemplary embodiment of the invention, the PVdF/acetone solution is coated on a composite graphite negative electrode. The negative electrode should have a porosity substantially between 25 to 40 percent. The PVdF/acetone solution may be applied by any of a number of known methods. According to one embodiment, a knife coater is used to coat the electrode. Alternatively, it may be extruded to coat the electrode at a substantially uniform thickness through use of a doctor blade, Meyer rod, or slot die, for example.

The negative electrode, coated with the PVdF/acetone solution, is then placed in an immersion bath. According to one preferred embodiment, the bath contains denatured ethanol (available from Ashland Chemicals, Charlotte, N.C.). Other immersion liquids that can be used in this process, though not exhaustive, are Hexane, Pentane, Benzene, Toluene, Methanol, Ethanol, Carbon Tetrachloride, o-Dichlorobenezene, Trichloroethylene, and water. In addition, different mixtures of these liquids and the solvents listed above may be used if the overall composition of the bath is a non-solvent. In this way, the amount of non-solvent in the bath can be used to regulate the time required to form the membrane, which will also control the final morphology of the membrane. In this embodiment, the coated electrode is immersed for at least 30 seconds in the ethanol bath. According to this process, once the coated electrode is placed in the bath, the ethanol replaces the acetone in the PVdF solution. By removing the acetone there is nothing to keep the PVdF in a liquid state and a membrane with a highly porous structure of PVdF is precipitated out of the solution. As a result the electrode is left coated with a porous membrane of PVdF.

The negative electrode and PVdF membrane are then removed from the bath and allowed to dry. Drying can be accomplished using air or heat, or combination thereof. According to one preferred embodiment the electrode can be dried in a convection oven with ambient temperature set to 100° C. The porosity of the dried membrane should be between 60 and 80 percent with a thickness of 40 $\mu$m to 110 $\mu$m. According to one preferred embodiment, the thickness should be between 60 $\mu$m to 90 $\mu$m.

The dried negative electrode-membrane structure is then cut into a rectangle approximately 83 mm long by 43 mm wide. A composite positive electrode based on $LiCoO_2$, $LiNiO_2$ $LiMn_2O_4$, alloys thereof, or other Lithium intercalating compounds, having a porosity substantially between 25–40 percent is cut into rectangles 81 mm long by 41 mm wide. One skilled in the art will appreciate that other dimensions could be used as determined by the specific application, or both the electrodes and the membrane can be laminated together as continuous webs.

Figure 1B:
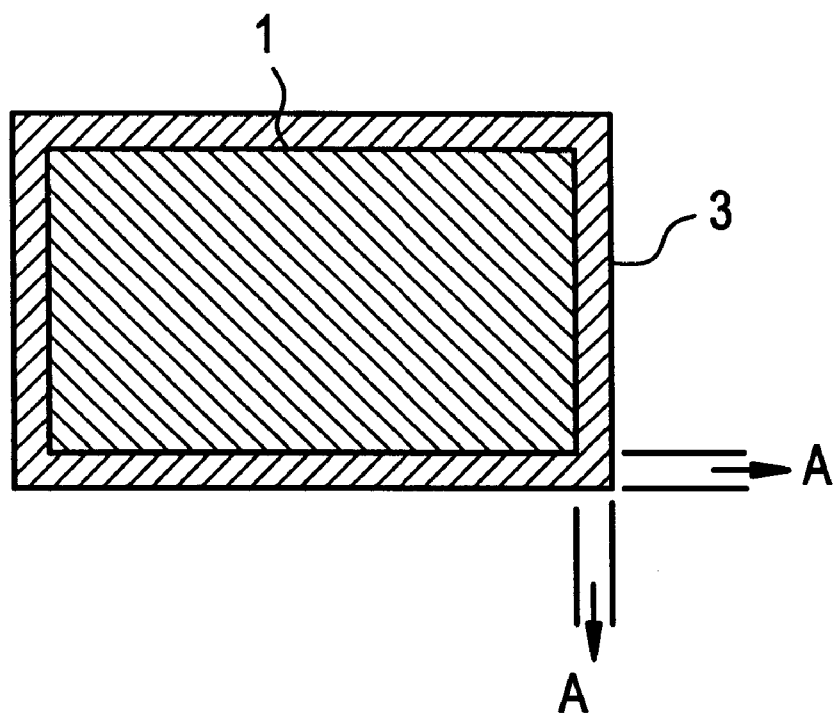

Turning to FIGS. 1A and B, the positive electrode plate 1 is then placed on top of the negative electrode 3-membrane 2 structure with the membrane 2 positioned between the electrodes 1 and 3. A 1 mm clearance "A" between the edge of the positive electrode 1 and the negative electrode 3 is provided all the way around the perimeter of the rectangular structure as shown in FIG. 1B. One skilled in the art will appreciate, that other clearances can be used depending on the requirements of the actual manufacturing process.

Figure 2:
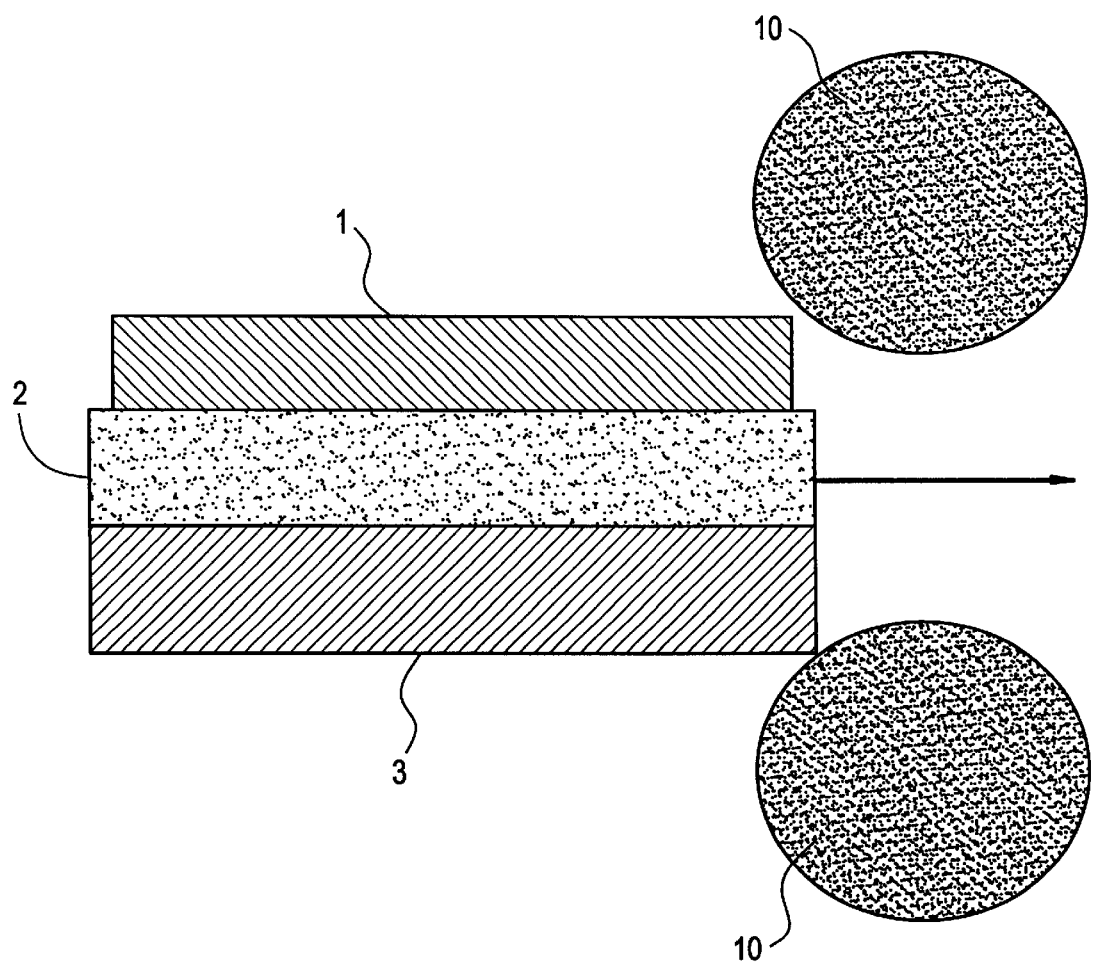
FIG. 2 shows an exemplary room temperature lamination of electrode-membrane-electrode structure according one embodiment of the invention.

As shown in FIG. 2, the stacked positive electrode (1)-membrane (2)-negative electrode (3) is then placed in a laboratory calender 10, such as a Accunip manufactured by KRHNRolls, Inc, Orange, Mass., and calendered together. According to this exemplary embodiment, the gap of the calender 10 should be adjusted such that the membrane is compressed to substantially 15 to 75 percent of its original thickness, according to one preferred embodiment 25 to 70 percent, thereby causing a dry bond to be formed between the porous membrane 3 and the positive electrode 1. According to this embodiment a dry bond with an adhesion force of 20 to 38 $N/cm^2$ may be obtained with best adhesion values reached with a compression ratio of 70 percent.

A dry bond is a physical bonding of the membrane structure with the electrode. The porosity of the membrane and the porosity of the electrode allow for cross-penetration of the membrane and electrode, which combined with the deformation caused by the calendering, physically cross-links the two structures. As a result, adhesion forces of 12–40 $N/cm^2$ may be obtained. In addition, the bonding is dry without out the need of any chemical reaction or atomic bonding. As a result, a strong physical bond is formed that resists the cracking and pealing associated with other prior lamination techniques. Furthermore, because the bonding is dry, there is no need for careful monitoring and control of room conditions during the lamination process, and no plasticizer or volatile compounds have to be removed.

According to another embodiment of the invention, the positive electrode may be coated as described above instead of the negative electrode. The positive electrode-membrane-electrode structure can then be calendered as described above.

According to an alternative embodiment of the invention, the membrane is coated on both the positive electrode and negative electrode, in a manner similar to that described above for the negative electrode. In this embodiment, the membrane has a porosity between 60 and 80 percent with a thickness of 25 $\mu$m to 75 $\mu$m. The positive electrode-membrane is then cut into rectangles 81 mm long by 41 mm wide and the negative membrane-electrode is cut into rectangles 83 mm long by 43 mm wide. One skilled in the art will appreciate that other dimensions could be used as determined by the specific application.

The positive membrane coated electrode is then placed on the negative membrane coated electrode with the membrane coatings facing each other. The positive electrode-membrane-membrane-negative electrode structure is then calendered. The gap of the calender according to this embodiment should be adjusted so that the membranes are compressed to 25–70 percent of their original thickness and according to one preferred embodiment to 35 to 50 percent. This causes the membranes to physically bond together forming and form a dry bond with an adhesion force ranging from 12–33 N/cm². In this embodiment, the best values can be reached with a compression ratio of approx. 40 percent.

According to yet another alternative embodiment of the invention, a free standing membrane may be formed separately using the immersion bath technique previously described. According to this method the membrane can be formed on a non-woven web, polypropylene sheet, or Mylar film, for example. The porosity of the membrane should be between 60 to 80 percent. A positive electrode having a porosity between 25–40 is cut into a rectangle 81 mm long by 41 mm wide and a negative electrode having a porosity between 30–40% is cut into a rectangle 83 mm long by 43 mm wide. The membrane is also cut into an 83 mm long by 43 mm wide rectangle. The membrane is place on the negative electrode and the positive electrode is placed on the membrane. The positive electrode-membrane-negative electrode structure is then calendered together. The gap of the calender according to this embodiment should be adjusted so that the membrane would be compressed to 15–70 percent of their original thickness and according to one preferred embodiment to 40–70 percent. This causes the membrane to physically bond to the positive and negative electrodes.

Figure 3A:
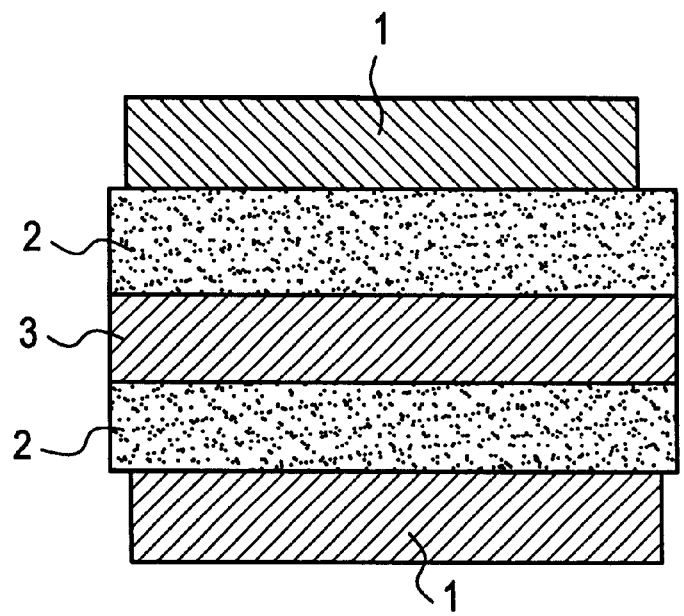
FIGS. 3A and 3B show an exemplary electrode-membrane-electrode-membrane-electrode structure.
Figure 3B:
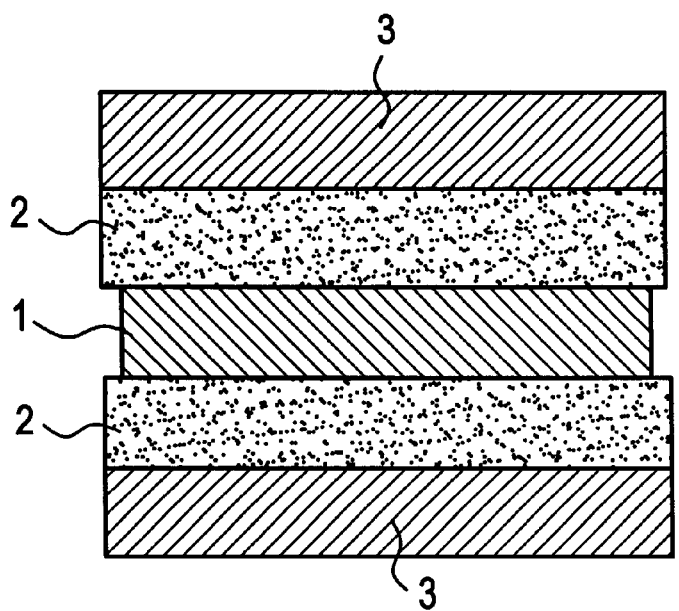

In another alternative embodiment of the invention, according to the processes described above, other cells structures can be achieved as shown if FIGS. 3A and 3B. For example, a positive electrode/membrane/negative electrode/membrane/positive electrode (FIG. 3A), or a negative electrode/membrane/positive electrode/membrane/negative electrode structure, can be achieved (FIG. 3B). According to this embodiment two negative or two positive electrodes are coated with a porous membrane. A positive or negative electrode is then placed substantially between the coated negative or positive electrodes, respectively, with the membranes facing the placed positive or negative electrode. The positive electrode/membrane/negative electrode/membrane/positive electrode or the negative electrode/membrane/positive electrode/membrane/negative electrode are then calendered together as described above.

Alternatively, the positive electrode, membrane, negative electrode, membrane, and positive electrode or a negative electrode, membrane, positive electrode, membrane, and negative electrode may be individually stacked in the corresponding structure and then calendered together as described above. Similarly, according to this another embodiment two negative or two positive electrodes are coated with a porous membrane. A positive or negative electrode are also coated and then placed substantially between the coated negative or positive electrodes, respectively, with the membranes of the electrodes facing each other. The structure may then be calendered together. Also, a membrane can be coated on both sides of a negative electrode and placed substantially between two positive electrodes. The structure may then be calendered together. In addition, a membrane can be coated on both sides of a positive electrode and placed substantially between two negative electrodes. The resulting structure may then be calendered together.

One skilled in the art will appreciate that although the processes for room temperature lamination above have been described by way of calendering the electrode membrane structure, other lamination techniques could also be used that compress the membrane according to the embodiments previously described. For example, two sheets of electrodes with a membrane therebetween can be placed in a static press and then pressed together.

According to the various embodiments of the present invention, a dry lamination can be obtained at room temperature without the need for heating, adhesives, or carefully regulated room conditions as required in prior techniques. This results in a quicker and more cost effective method for creating cells. In addition, a physical bond between the membrane and electrode is obtained thereby resisting cracking or pealing and providing a longer life to any cell. In addition, cell capacity can be maintained.

Finally, it is noted that although heating is not required in order to form a good dry bond according to the above described embodiments, nothing in the various embodiments of the present invention preclude using heating in combination with the disclosed methods. For example, in the case of membrane to membrane bonding, using a high compression ratio at a high temperature can increase adhesion forces from 26 to 33 N/cm². Additionally, curing at high temperature may also be used in conjunction with the various embodiments of the invention to provide better adhesion forces in some cases.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A method of manufacturing an electrolytic cell comprising the steps of:
   placing a porous membrane between a first electrode and second electrode;
   compressing the membrane between the electrodes at a room temperature thereby dry bonding the membrane to the electrodes.

2. The method of claim 1 wherein said step of compressing further comprises calendering said membrane and first electrode with said second electrode.

3. The method of claim 1, wherein the first electrode as a porosity substantially between 25–40% and said second electrode as a porosity substantially between 25 to 40%.

4. The method of claim 1, wherein said step of compressing further comprises compressing said membrane to at least 20% of an original thickness of said membrane.

5. The method of claim 1, wherein said membrane initially has a porosity of at least 50%.

6. The method of claim 5, wherein said membrane is formed of a polyvinylidene diflouride homopolymer.

7. The method of claim 1, wherein said dry bond has an adhesion force greater than 10 N/cm$^2$.

8. A method of manufacturing an electrolytic cell comprising the steps of:

mixing a polyvinylidene diflouride homopolymer and solvent to form a solution;

coating said solution on said first electrode;

coating said solution on said second electrode;

immersing said first and second coated electrodes in a liquid filled bath thereby creating a porous membrane on said first and second electrodes;

drying the first and second coated electrodes;

placing the first electrode opposite said second electrode with the respective membranes positioned substantially between said first and second electrodes;

compressing the membranes between the first and second electrodes thereby dry bonding said first and second electrodes together.

9. The method of claim 8 wherein said step of compressing further comprises compressing said membrane at least 25% of an original thickness of said membrane.

10. The method of claim 8, wherein said step of creating said porous membranes on said first and second electrodes further comprises creating said membranes having a porosity of at least 60%.

11. The method of claim 10, wherein said step of creating said porous membranes on said first and second electrodes further comprises creating said membrane on said first electrode having a thickness of 50 $\mu$m to 120 $\mu$m and said membrane on said second electrode having a thickness of 25 $\mu$m to 100 $\mu$m.

12. An electrolytic cell made according to the method of claim 11.

13. A method of manufacturing a lithium secondary cell including a microporous ployvinylidene difluoride homopolymer (PVdF) membrane comprising the steps of:

providing a lithium based electrode;

placing the PVdF membrane on said electrode; and compressing said electrode and membrane at a room temperature, wherein said electrode and the PVdF membrane are dry bonded with an adhesion force of at least 10 N/cm$^2$.

14. The method of claim 13, wherein the step of compression compresses said membrane to at least 70 percent of its original thickness.

15. A Lithium ion cell manufactured according to the method of claim 14.

* * * * *